United States Patent
Hall et al.

(10) Patent No.: US 7,311,626 B2
(45) Date of Patent: Dec. 25, 2007

(54) CRANK SHAFT POWER TAKEOFF SYSTEM AND METHOD

(75) Inventors: Peter M. Hall, Arden, NC (US); Jeff Simerly, Hendersonville, NC (US); Larry Sance, Saluda, NC (US)

(73) Assignee: Peco, Inc., Aroen, NC (US)

( * ) Notice: Subject to any disclaimer, the term of this patent is extended or adjusted under 35 U.S.C. 154(b) by 549 days.

(21) Appl. No.: 10/791,366

(22) Filed: Mar. 1, 2004

(65) Prior Publication Data

US 2005/0192145 A1 Sep. 1, 2005

(51) Int. Cl.
*F16H 7/10* (2006.01)
*F16H 7/08* (2006.01)
*B62J 13/00* (2006.01)

(52) U.S. Cl. .................. 474/101; 474/114; 474/144

(58) Field of Classification Search ........ 474/113–117, 474/101, 144; 56/13.3, 16.6, 11.3, 202; 180/202, 180/312, 256, 367, 374, 373
See application file for complete search history.

(56) References Cited

U.S. PATENT DOCUMENTS

| | | | | |
|---|---|---|---|---|
| 2,669,078 A | * | 2/1954 | Gregory | 56/13.2 |
| 2,927,571 A | * | 3/1960 | Kamlukin | 474/114 |
| 3,945,176 A | * | 3/1976 | Vicendese et al. | 56/11.8 |
| 4,104,812 A | * | 8/1978 | Stribiak, Jr. | 37/243 |
| 4,409,779 A | * | 10/1983 | Bent et al. | 56/11.3 |
| 4,996,829 A | * | 3/1991 | Saitoh et al. | 56/13.3 |
| 5,224,327 A | * | 7/1993 | Minoura et al. | 56/13.3 |
| 5,377,774 A | * | 1/1995 | Lohr | 474/14 |
| 5,485,715 A | * | 1/1996 | Breeden | 56/13.3 |
| 5,778,648 A | * | 7/1998 | Parkes et al. | 56/16.6 |
| 6,449,933 B1 | * | 9/2002 | Umemoto et al. | 56/13.3 |
| 6,454,041 B2 | * | 9/2002 | Ishimori et al. | 180/374 |
| 6,644,003 B1 | * | 11/2003 | Bass | 56/12.8 |

* cited by examiner

*Primary Examiner*—Marcusc Charles
(74) *Attorney, Agent, or Firm*—Carter & Schnedler, PA.

(57) ABSTRACT

A crank shaft power takeoff system, including an appliance intended for use in connection with lawns and/or gardens, the appliance including an engine that includes a crank shaft, the system further including an accessory used in conjunction with the appliance, and a transmission for utilizing the crank shaft of the appliance engine to operate the accessory.

15 Claims, 8 Drawing Sheets

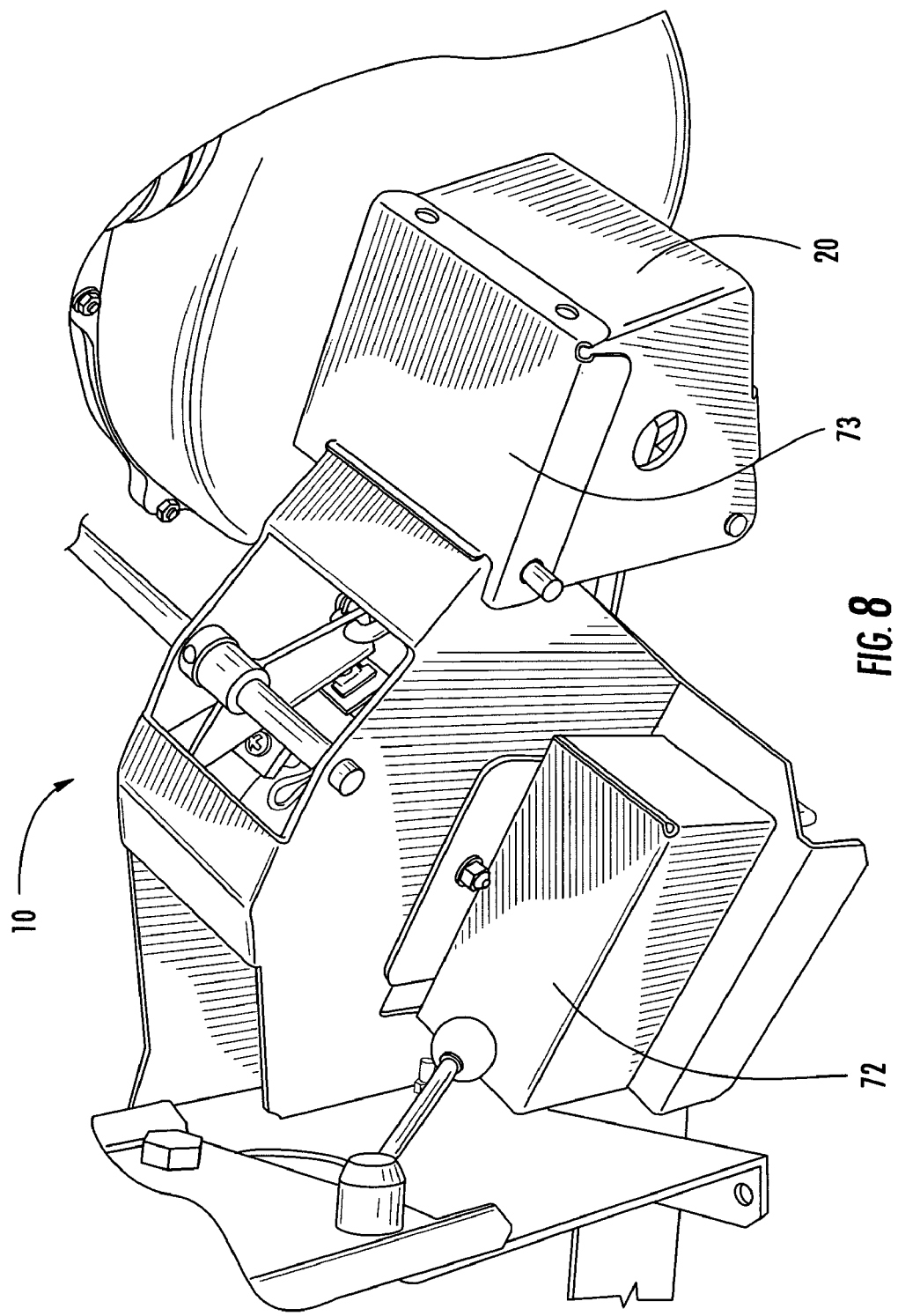

CRANK SHAFT POWER TAKEOFF SYSTEM AND METHOD

BRIEF DESCRIPTION OF THE DRAWINGS

FIG. 8 is a fragmentary perspective view of the embodiment of the invention shown in FIG. 1 with guards mounted thereon.

DETAILED DESCRIPTION

Figure 1:
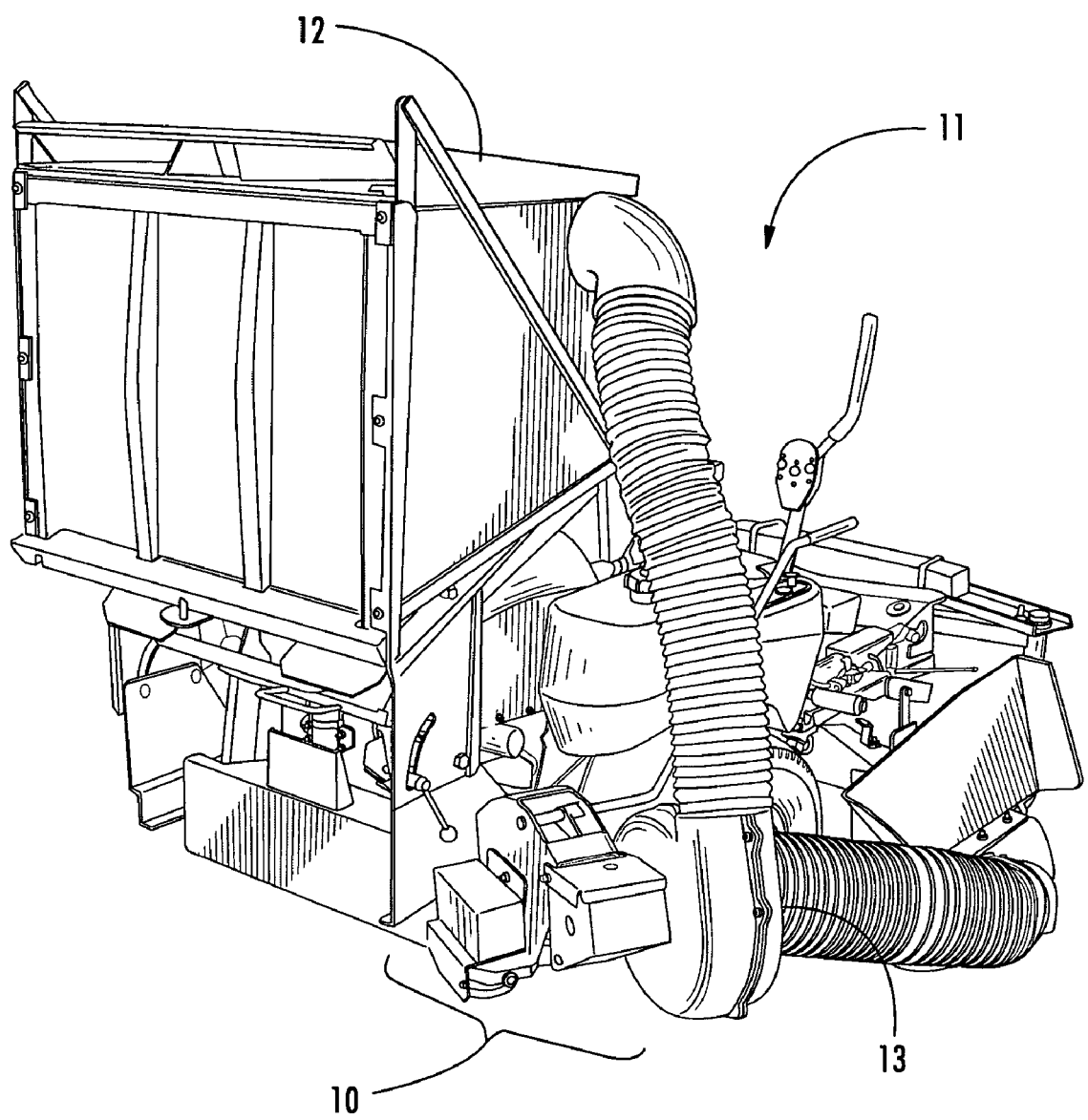
FIG. 1 is a perspective view of a lawn mower with an embodiment of the invention mounted thereon.

A crank shaft power takeoff (PTO) system according to an embodiment of the invention is shown broadly in FIG. 1 at reference numeral 10 mounted on a lawn mower 11 that is provided with a bin 12 for collecting lawn clippings (not shown) output by the mower 11. In the illustrated embodiment, the invention is used in conjunction with a blower/vacuum assembly 13 that vacuums the clippings (not shown) output by the mower 11, mulches the clippings, and blows the clippings into the bin 12. The structures of the mower 11, the blower/vacuum assembly 13 and the bin 12 are known to those of ordinary skill in the art. The mower 11 illustrated in the drawings is the Model 260Z mower manufactured and marketed under the GRAVELY trademark by Ariens Corporation of Brillion, Wis., while the bin 12 and the blower/vacuum assembly 13 are manufactured and marketed by Peco Inc. of Arden, N.C., the assignee of the present application, as part of a lawn vacuum system for the GRAVELY 260Z mower. However, Peco Inc. manufactures and markets such systems for a wide variety of makes, models, and designs of mowers. In addition, the potential applications of the crank shaft power takeoff system, an embodiment of which is described herein, extend beyond lawn vacuums into, for instance, other residential or industrial/commercial motorized lawn and garden appliances that include systems and/or accessories that need to be driven in some manner by the appliance engine, regardless of whether such systems and/or accessories are manufactured by an original equipment manufacturer, by a third party manufacturer such as Peco Inc., or by an owner/operator of the appliance.

Figure 2:
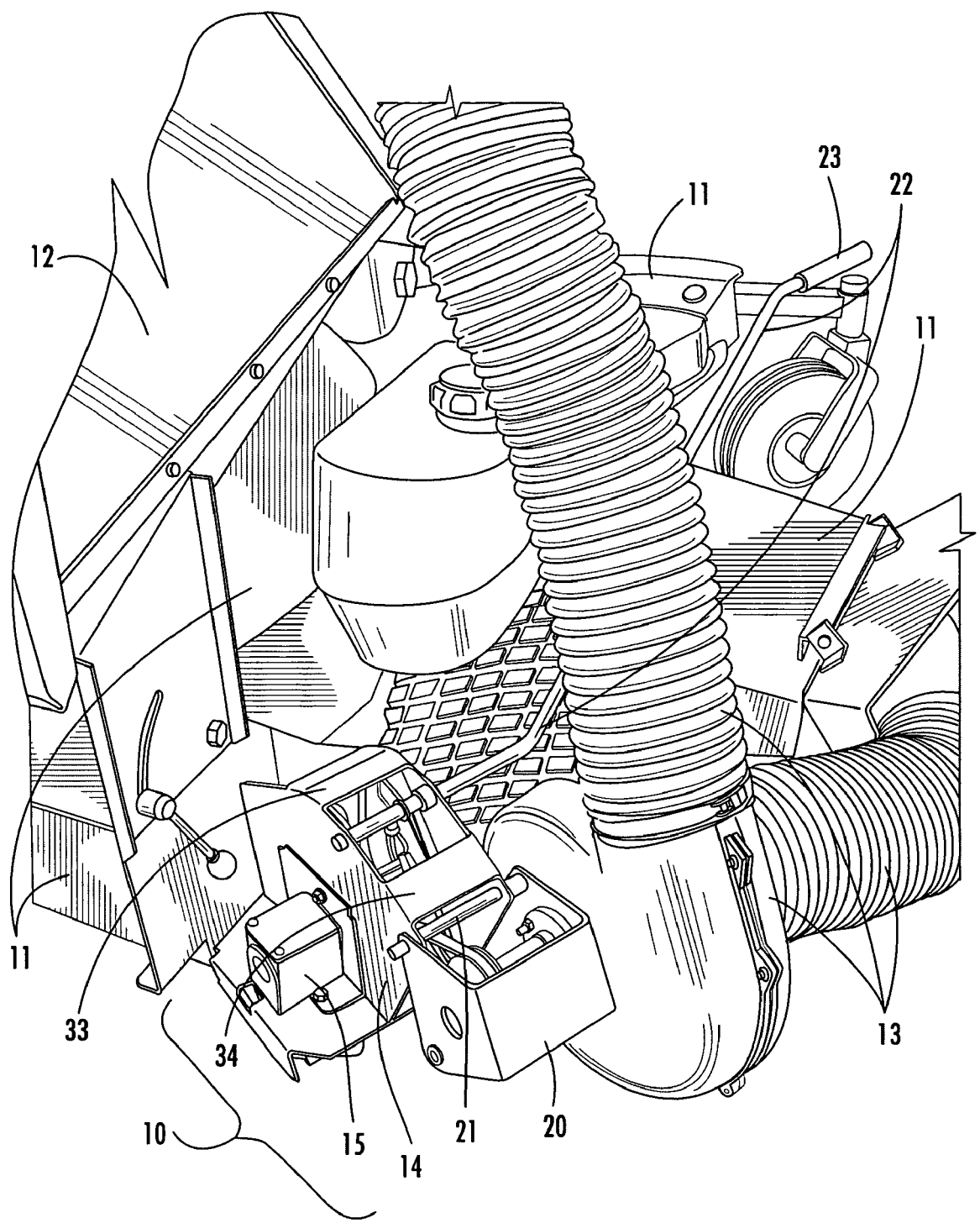
FIG. 2 is a fragmentary perspective view of the lawn mower and the embodiment of the invention shown in FIG. 1.

Turning now to FIG. 2, a fragmentary perspective view of the system 10 is shown. The system 10 includes a first pulley housing 14, a gearbox 15 mounted on the first pulley housing 14, and a second pulley housing 20. The second pulley housing 20 is pivotally mounted onto the first pulley housing 14 with a pivot rod 21. An engagement lever 22 provided with a handle 23 is accessible from an operator seat (not shown) on the mower 11 to selectably engage and disengage the system 10.

Figure 3:
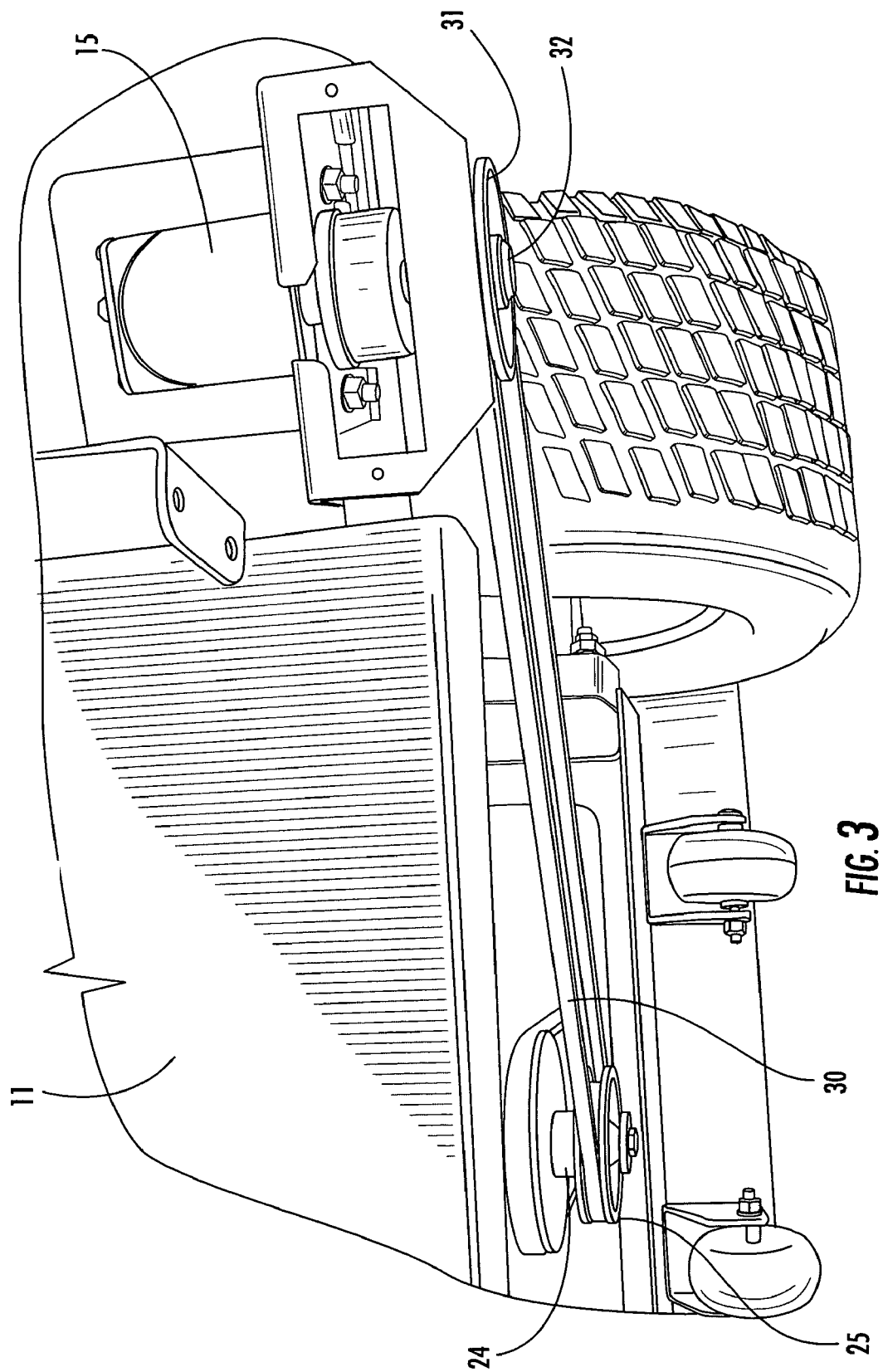
FIG. 3 is a fragmentary rear perspective view of the lawn mower and the embodiment of the invention shown in FIG. 1.

The operation of the system 10 will now be described with reference to the various structures involved. Looking at FIG. 3, the underside of the mower 11 is shown from the rear of the mower 11. Specifically, the mower 11 includes a crank shaft 24. A master pulley 25 is mounted on the crank shaft 25 and a first belt 30 is carried on the master pulley 25 and a first slave pulley 31. The first slave pulley 31 is mounted on a shaft 32 that communicates with the gearbox 15. The gearbox 15 includes gears (not shown) providing 90-degree displacement at a 1:1 ratio. The gearbox 15 in the illustrated embodiment is a Model 1000-042 Peerless gearbox manufactured by Tecumseh Products Company of Tecumseh, Mich. and operates in accordance with the knowledge and understanding of those with ordinary skill in the art.

Figure 4:
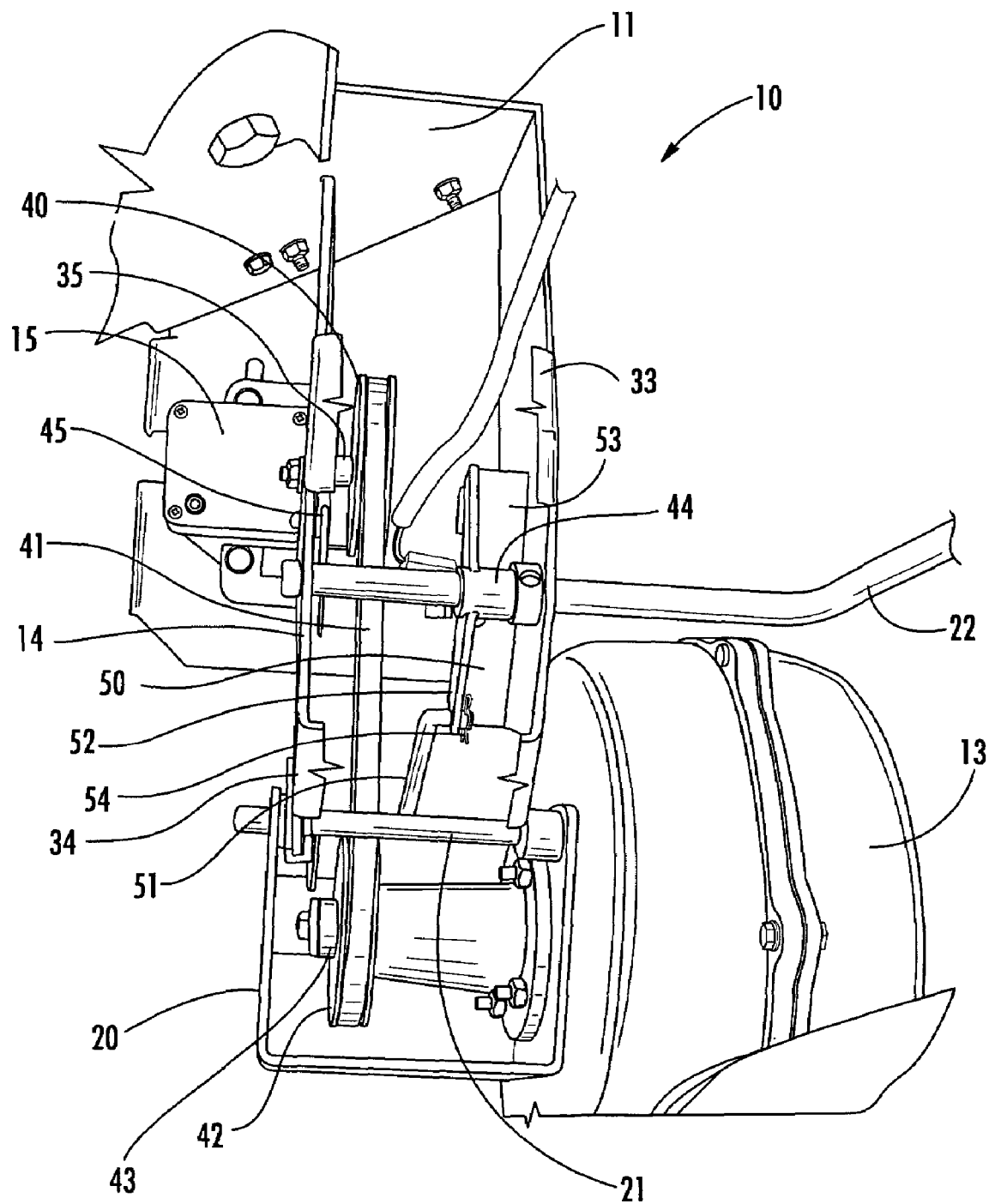
FIG. 4 is a fragmentary top plan view of the embodiment of the invention shown in FIG. 1.

Turning now to FIG. 4, the first pulley housing 14 and the second pulley housing 20 are shown with plates 33, 34 (FIGS. 2, 4) substantially cut away to enable unobstructed views into the first pulley housing 14. The gearbox 15 communicates with a shaft 35 that a second slave pulley 40 is mounted upon. A second belt 41 is carried on the second slave pulley 40 and a third slave pulley 42. The third slave pulley 42, which is housed in the second pulley housing 20, is mounted on a shaft 43 that also carries an impeller (not shown) within the blower/vacuum assembly 13. The impeller rotates to vacuum the lawn clippings (not shown) output by the mower 11 toward the impeller, mulch the clippings, and blow the mulched clippings into the bin 12 (FIG. 2) for later disposal or use.

Still looking at FIG. 4, an assembly for selectably engaging and disengaging the system 10 may also be described. The engagement lever 22 is inserted through ports in the first pulley housing 14 and is maintained in a desired position relative to the first pulley housing 14 by a flanged fitting 44 is mounted on the lever 22 and a pin 45 carried through a port (not shown) in the lever 22. A generally L-shaped engagement plate 50 including a vertical portion 52 and a horizontal portion 53 is mounted on the flanged fitting 44. A generally L-shaped engagement rod 51 is carried through a port in the vertical portion 52 of the engagement plate 50 and maintained in a desired position by a pin 54 carried through a port in the engagement rod 51.

Figure 5:
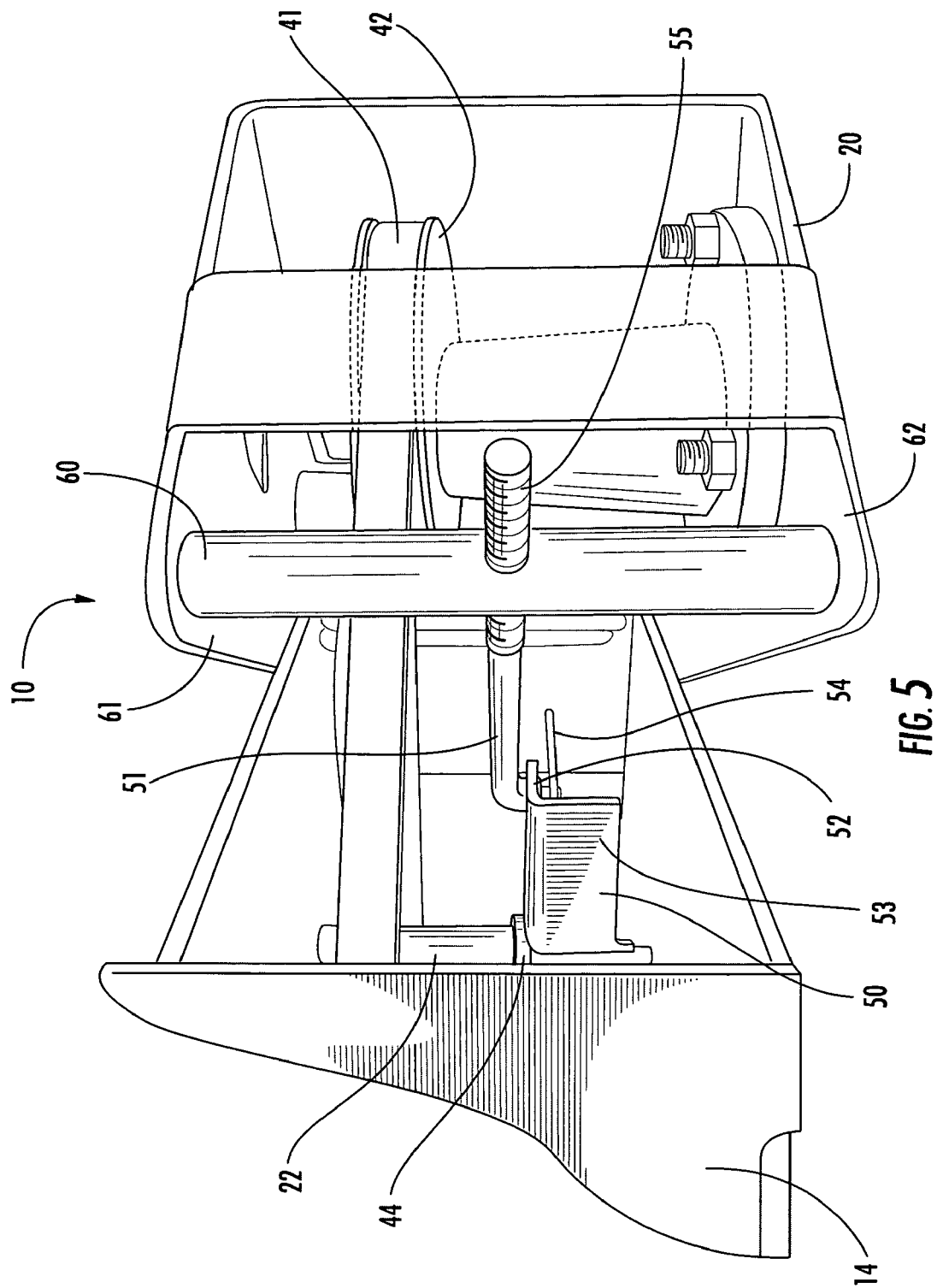
FIG. 5 is a fragmentary bottom plan view of the embodiment of the invention shown in FIG. 1.

Turning now to FIG. 5, a bottom plan view of the intersection of the first and second pulley housings 14, 20 is shown. The engagement rod 51 has a threaded end 55 that, during assembly of the system 10, is threaded through a threaded port in a receiving rod 60 secured between opposing sides 61, 62 of the second pulley housing 20.

Figure 6:
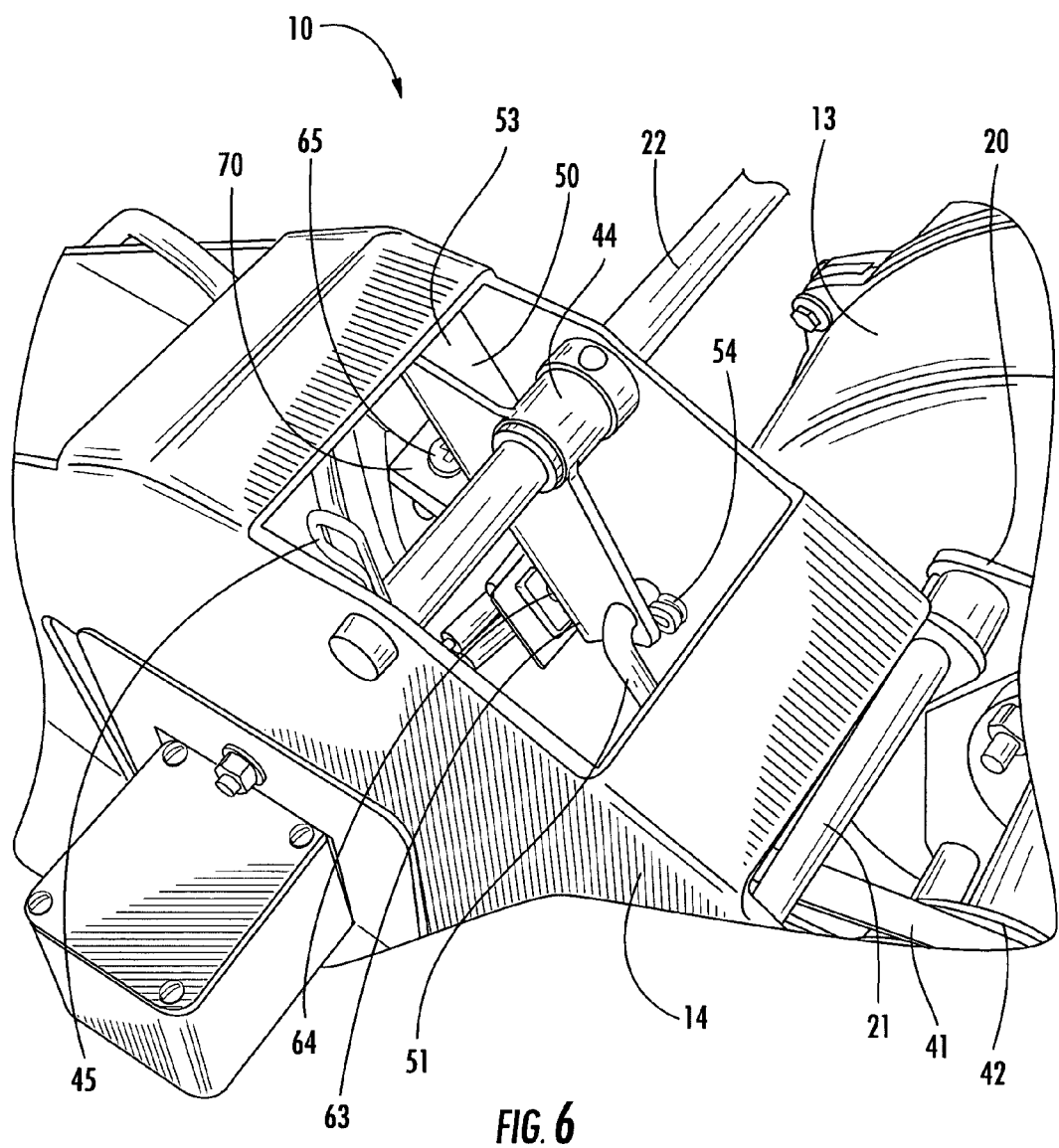
FIG. 6 is a fragmentary perspective view of the embodiment of the invention shown in FIG. 1 when in an engaged position.
Figure 7:
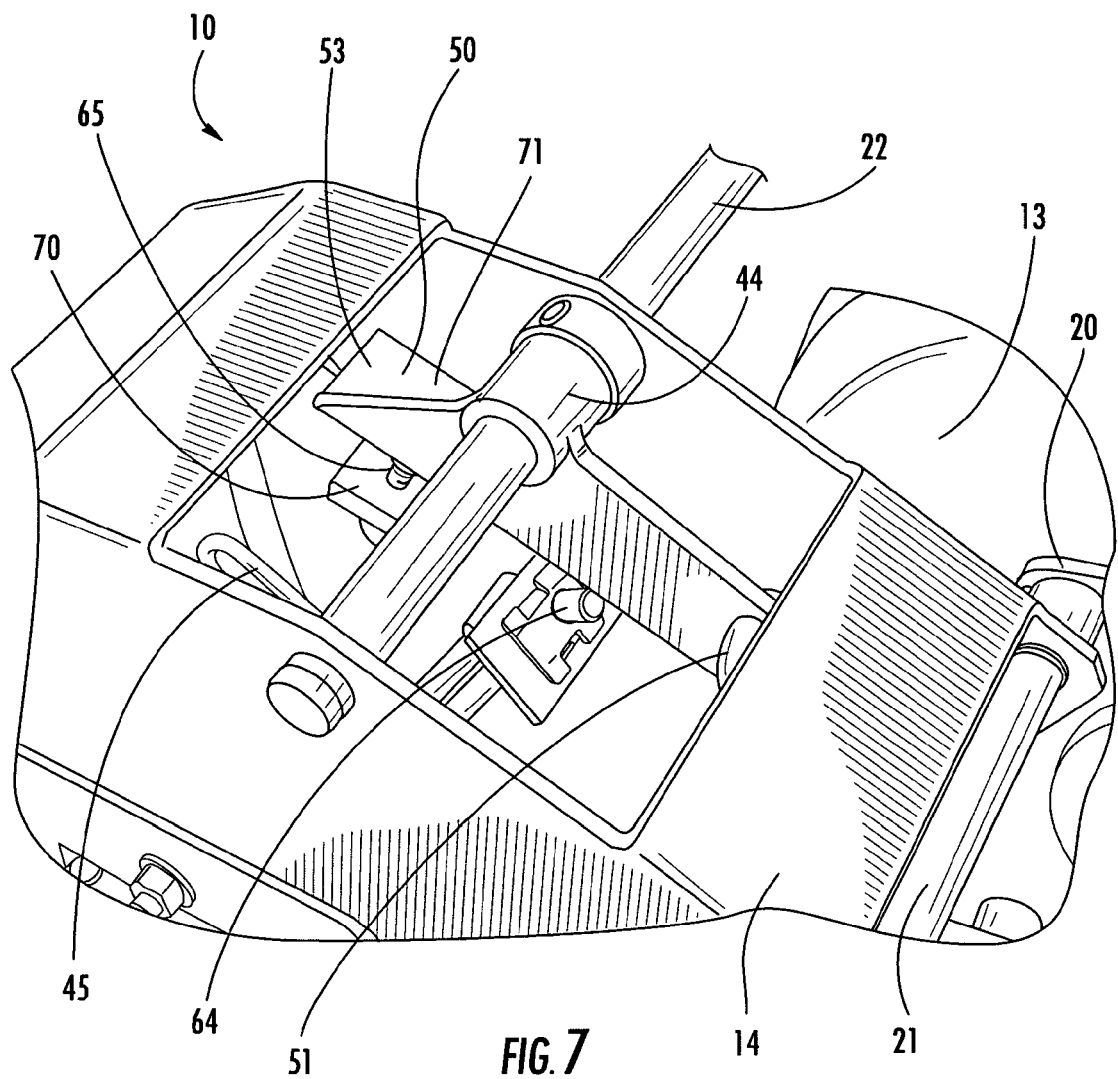
FIG. 7 is a fragmentary perspective view of the embodiment of the invention shown in FIG. 1 when in a disengaged position.

FIGS. 6 and 7 illustrate positions of the engagement plate 50 when the system 10 is engaged and disengaged, respectively. The directions "clockwise" and "counterclockwise" are indicated herein with reference to a rear-to-front view of the mower 11, as is generally shown in the drawings; if one is viewing the mower 11 from front to rear, the directions would be reversed. Looking first at FIG. 6, the engagement lever 22 has been rotated in a clockwise motion by an operator (not shown) such that the engagement plate 50 is moved clockwise and the engagement rod 51 is urged generally downward. As seen in FIGS. 1 and 2, the operator could achieve this rotation of the engagement lever 22 by using the handle 23 to push the engagement lever 22 away from the operator. The generally downward motion of the engagement rod 51 causes the receiving rod 60 (FIG. 5) of the second pulley housing 20 to pivot the second pulley housing 20 generally downward and in a generally counterclockwise motion about the pivot rod 21, moving the second slave pulley 40 (FIG. 4) and the third slave pulley 42 further apart, thereby tightening or enhancing tension on the second belt 41 and engaging the system 10. Still looking at FIG. 6, when the engagement plate 50 is in the position shown in FIG. 6, a lower region 63 of the horizontal portion 53 of the engagement plate 50 depresses an electrical safety switch 64, which in turn causes a removal of weight from the operator seat (not shown), such as that caused by an operator (not shown) rising from the operator seat, to shut off the system 10 electrically.

Turning now to FIG. 7, the engagement lever 22 has been rotated counterclockwise such as by an operator (not shown) pulling the handle 23 (FIG. 2) of the engagement lever 22 toward the operator. In this position, the engagement plate 50 has been moved counterclockwise and the engagement rod 51 has been pulled generally upward. This generally upward motion of the engagement rod 51 in turn pulls upward on the receiving rod 60 (FIG. 5) of the second pulley housing 20 and pivots the second pulley housing 20 generally upward and in a generally clockwise motion about the pivot rod 21, bringing the second slave pulley 40 (FIG. 4) and the third slave pulley 42 closer together, thereby loosening or reducing tension on the second belt 41 and disengaging the system 10. Still looking at FIG. 7, when the engagement plate 50 is moved counterclockwise, an upper region 71 of the horizontal portion 53 of the engagement plate 50 contacts a backstop screw 65, thereby preventing overrotation of the engagement plate 50 and resultant overloosening of the second belt 41. The backstop screw 65 is threaded through a plate 70 and may be adjusted to provide the desired range of motion of the engagement plate 50 and by extension, the desired amount of loosening of the second belt 41.

If the mower engine (not shown) is running, the system 10 ensures that the second slave pulley 40 (FIG. 4) remains in motion, even when the second belt 41 is loosened to disengage the system as described above. The engagement and disengagement of the system 10 is therefore achieved by the tightening and loosening, respectively, of the second belt 41 to selectably transmit or cease transmission of the motion of the second slave pulley 40 to the third slave pulley 42, thereby activating or deactivating, respectively, the blower/vacuum assembly 13.

FIG. 8 illustrates the system 10 with guards 72, 73 installed to cover the gearbox 15 (FIG. 2) and the second pulley housing 20, respectively.

A crank shaft power takeoff system is described above. Various details of the invention may be changed without departing from its scope. Furthermore, the foregoing description of an embodiment of the invention and the best mode for practicing the invention are provided for the purpose of illustration only and not for the purpose of limitation—the invention being defined by the claims.

What is claimed is:

1. A crank shaft power takeoff system, comprising:
   an appliance comprising an engine that includes a crank shaft;
   an accessory used in conjunction with the appliance; and
   a transmission for utilizing the crank shaft of the appliance engine to operate the accessory, wherein the transmission comprises:
   a first pulley housing;
   a second pulley housing pivotally connected to the first pulley housing;
   a belt oriented within the first and second pulley housings; and
   an engagement assembly for pivoting the second pulley housing relative to the first pulley housing to selectably tighten or loosen the belt, thereby activating or deactivating the accessory, respectively, as desired.

2. A crank shaft power takeoff system according to claim 1, wherein the appliance is a lawn mower.

3. A crank shaft power takeoff system according to claim 1, wherein the accessory is a blower/vacuum assembly.

4. A crank shaft power takeoff system according to claim 1, wherein the appliance is a lawn mower and the accessory is a blower/vacuum assembly.

5. A crank shaft power takeoff system according to claim 1, wherein the engagement assembly comprises:
   an engagement lever oriented for manipulation by an operator of the appliance;
   an engagement plate fixedly secured to the engagement lever, the engagement plate being oriented in the first pulley housing;
   a receiving rod secured to the second pulley housing;
   an engagement rod connecting the engagement plate to the receiving rod; and
   wherein movement of the engagement lever into an engaged position by the operator of the appliance pivots the second pulley housing relative to the first pulley housing, thereby tightening the belt and engaging the system.

6. A crank shaft power takeoff system, comprising:
   an appliance comprising an engine that includes a crank shaft;
   an accessory used in conjunction with the appliance; and
   a transmission for utilizing the crank shaft of the appliance engine to operate the accessory, said transmission comprising:
   a plurality of pulleys;
   a first pulley housing;
   a second pulley housing pivotally connected to the first pulley housing;
   at least one belt carried on two of the pulleys and oriented within the first and second pulley housings; and
   an engagement assembly for pivoting the second pulley housing relative to the first pulley housing to selectably tighten or loosen the belt, thereby activating or deactivating the accessory, respectively, as desired.

7. A crank shaft power takeoff system according to claim 6, wherein the appliance is a lawn mower.

8. A crank shaft power takeoff system according to claim 6, wherein the accessory is a blower/vacuum assembly.

9. A crank shaft power takeoff system according to claim 6, wherein the appliance is a lawn mower and the accessory is a blower/vacuum assembly.

10. A crank shaft power takeoff system according to claim 6, wherein the engagement assembly comprises:
    an engagement lever oriented for manipulation by an operator of the appliance;
    an engagement plate fixedly secured to the engagement lever, the engagement plate being oriented in the first pulley housing;
    a receiving rod secured to the second pulley housing;
    an engagement rod connecting the engagement plate to the receiving rod; and
    wherein movement of the engagement lever into an engaged position by the operator of the appliance pivots the second pulley housing relative to the first pulley housing, thereby tightening the belt and engaging the system.

11. A method for utilizing motion of a crank shaft, said method comprising the steps of:
  providing an appliance comprising an engine that includes a crank shaft;
  providing an accessory used in conjunction with the appliance;
  utilizing motion of the crank shaft to activate the accessory, wherein said crank shaft utilizing step comprises the steps of:
    providing:
    a first pulley housing;
    a second pulley housing pivotally connected to the first pulley housing;
    a belt oriented within the first and second pulley housings;
    an engagement assembly; and
    utilizing the engagement assembly to pivot the second pulley housing relative to the first pulley housing to tighten the belt, thereby activating the accessory.

12. A method for utilizing motion of a crank shaft according to claim 11, wherein said appliance is a lawn mower.

13. A method for utilizing motion of a crank shaft according to claim 11, wherein said accessory is a blower/vacuum assembly.

14. A method for utilizing motion of a crank shaft according to claim 11, wherein said appliance is a lawn mower and said accessory is a blower/vacuum assembly.

15. A method for utilizing motion of a crank shaft according to claim 11, wherein:
  said engagement assembly comprises:
    an engagement lever oriented for manipulation by an operator of the appliance;
    an engagement plate fixedly secured to the engagement lever, the engagement plate being oriented in the first pulley housing;
    a receiving rod secured to the second pulley housing;
    an engagement rod connecting the engagement plate to the receiving rod; and
  said engagement assembly utilizing step is performed by moving the engagement lever into an engaged position.

* * * * *